Jan. 26, 1937.     H. C. SATTERTHWAITE     2,069,099
APPARATUS FOR FINISHING BEARING SURFACES
Filed Feb. 4, 1935    3 Sheets-Sheet 1
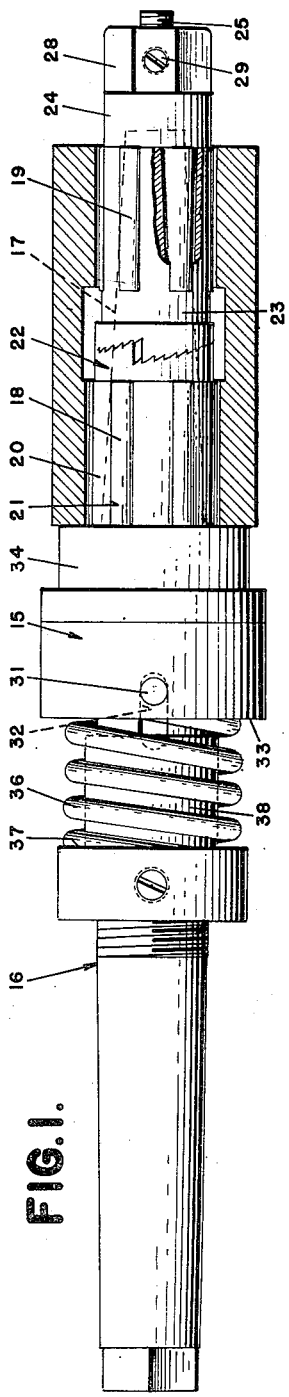
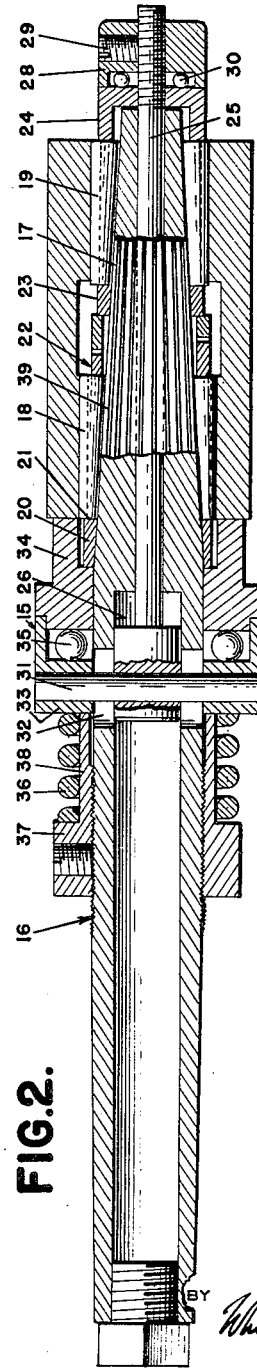
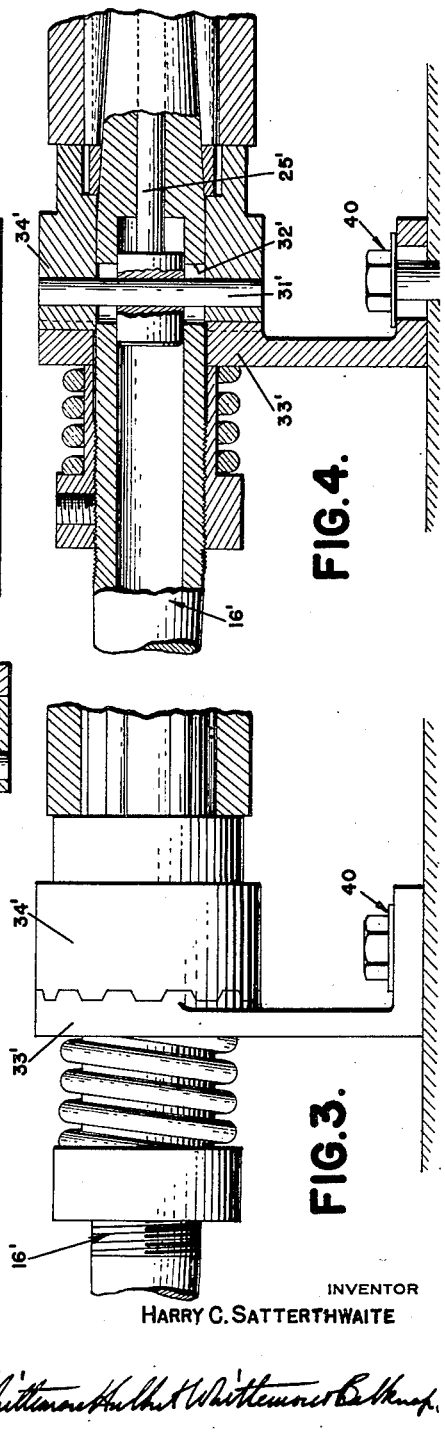
INVENTOR
HARRY C. SATTERTHWAITE
ATTORNEYS

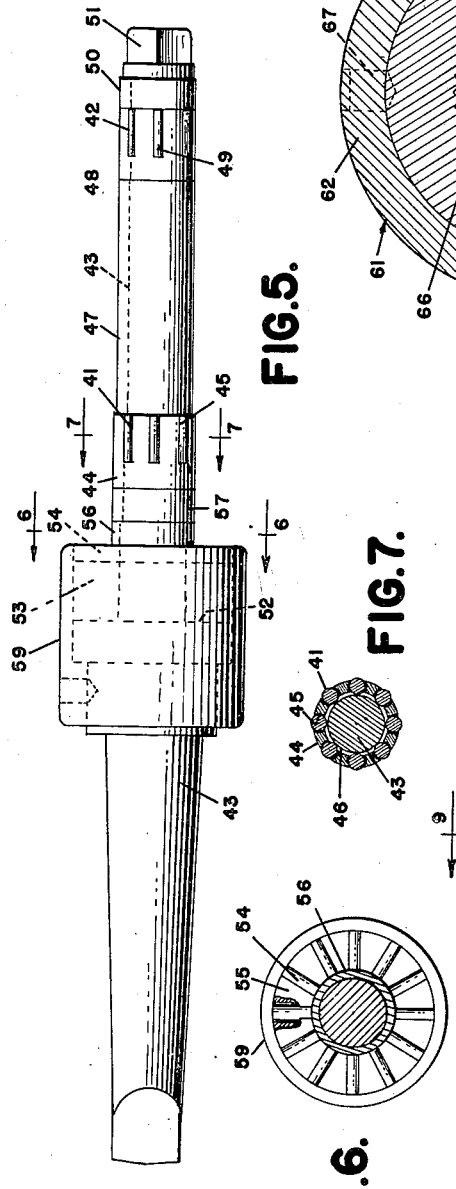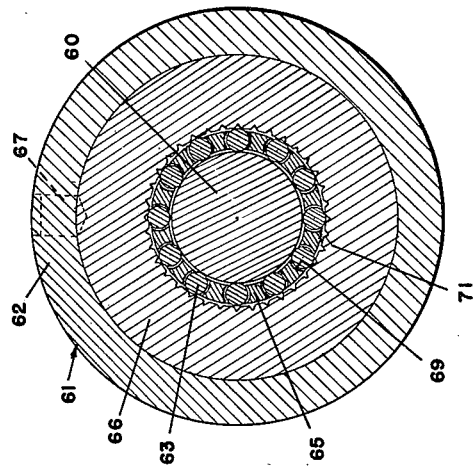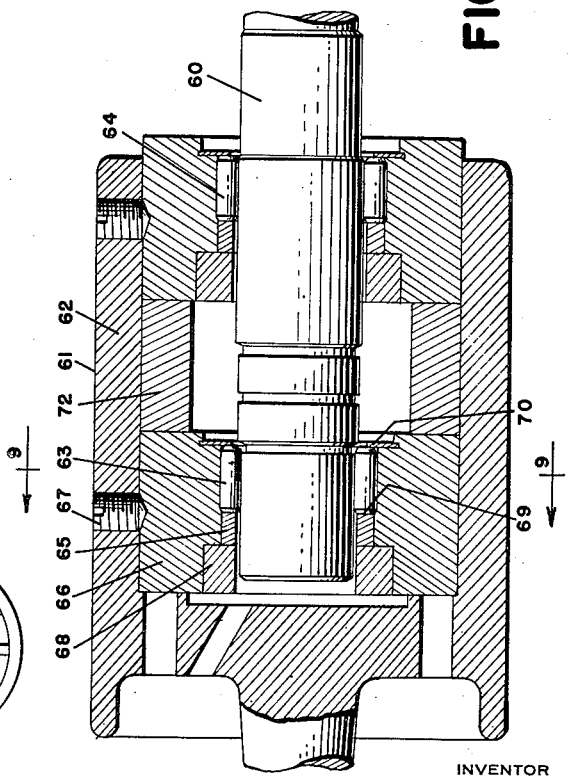

Jan. 26, 1937.  H. C. SATTERTHWAITE  2,069,099
APPARATUS FOR FINISHING BEARING SURFACES
Filed Feb. 4, 1935   3 Sheets-Sheet 3
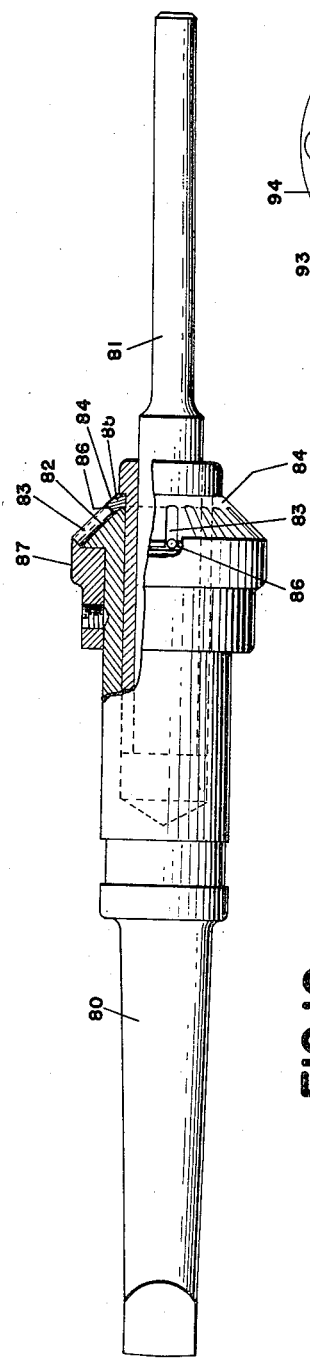
FIG.10.
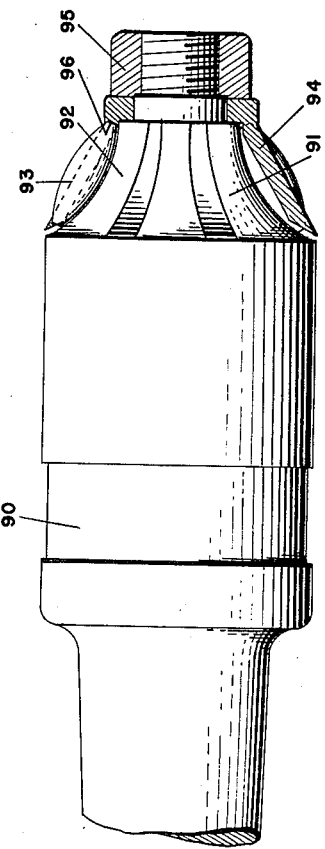
FIG.12.
FIG.11.
INVENTOR
HARRY C. SATTERTHWAITE
BY
ATTORNEYS Patented Jan. 26, 1937

2,069,099

UNITED STATES PATENT OFFICE 2,069,099

APPARATUS FOR FINISHING BEARING SURFACES

Harry C. Satterthwaite, Southfield Township, Oakland County, Mich., assignor to Cogsdill Manufacturing Company, Inc., Detroit, Mich., a corporation of Michigan Application February 4, 1935, Serial No. 4,960

15 Claims. (Cl. 29—33)

This invention relates to improvements in apparatus for finishing surfaces of various shapes including, vertical, tapered, and curved bearing surfaces.

One of the principal objects of this invention resides in the provision of a relatively simple method for processing a metallic work piece rendering it possible to impart a smoother, more accurate and denser surface to the portion of the work acted upon irrespective of whether the surface is cylindrical, radial, tapered or curved. The present invention contemplates imparting a smoother and more accurate surface to the work piece by subjecting the surface to combined rolling and sliding pressures determined in dependence upon the structure of the material forming the surface and, in addition, contemplates increasing the density of the surface by peening the latter, or by subjecting the same to a successive series of impacts.

Another object of this invention resides in the provision of apparatus for carrying out the method previously referred to, having a series of processing rolls mounted in a cage permitting relative angular displacement of the rolls with respect to the cage. This angular displacement of the processing rolls is highly desirable, since it permits imparting the aforesaid sliding pressure to the surface during the rolling operation and thereby offers the possibility of obtaining a smoother, more accurate surface than if the axes of the rolls were fixed.

Another advantageous feature of this invention resides in the provision of apparatus of the above type, wherein the support for the processing rolls is fashioned to periodically force the latter against the surface to be processed so as to peen this surface and thereby increase the density of the same.

Still another object of the present invention consists in the provision of a processing tool having finishing rolls normally arranged in a position wherein the outside diameter thereof is sufficiently less than the internal diameter of the bore to be processed to permit freely inserting the rolls in the bore and, in addition, having means operable in dependence upon inserting the processing rolls into the bore to expand the latter rolls into engagement with the internal surface of the bore.

A further advantageous feature of this invention consists in the provision of a processing tool of the type set forth in the preceding paragraph having means for periodically releasing the processing rolls from engagement with the surface of the work so as to effect a slight peening action of the rolls on the surface each time the former are reengaged with the latter. The feature of periodically releasing the processing rolls from engagement with the surface of the work is particularly advantageous in a construction wherein the rolls and the portion of the revoluble arbor supporting the rolls are oppositely tapered to effect the desired radial adjustment of the rolls, since in such constructions the ends of the rolls engaging the portion of the arbor of greatest diameter have a higher peripheral speed than the ends of the rolls engaging the portion of the arbor of less diameter and, as a consequence, there is a tendency for the rolls to slide along the surface as long as the rolls are maintained under pressure in contact with the surface. However, by periodically relieving the contacting pressure between the processing rolls and the surface of the work, rotation of the rolls relative to the surface is insured and different portions of the rolls will be brought into contact with the surface during the finishing operation.

Still another feature of the present invention resides in the provision of a processing tool having an arbor provided with a tapered portion for supporting a plurality of sets of processing rolls, and having means for independently adjusting the sets of rolls axially of the arbor to vary the diameter of the several series of rolls.

In addition to the foregoing, the present invention contemplates apparatus for processing surfaces irrespective of the particular contour of the latter and this feature as well as the foregoing objects will be made more apparent as this description proceeds, especially when considered in connection with the accompanying drawings, wherein:

Figure 1 is a side elevational view of a processing tool constructed in accordance with this invention;

Figure 2 is a longitudinal sectional view through the tool shown in Figure 1;

Figure 3 is a fragmentary view similar to Figure 1 showing a modified form of processing tool;

Figure 4 is a longitudinal sectional view through the construction shown in Figure 3;

Figure 5 is a side elevational view of another embodiment of this invention;

Figures 6 and 7 are respectively cross sectional views taken on the lines 6—6 and 7—7 of Figure 5;

Figure 8 is a longitudinal sectional view through still another modified form of processing tool;

Figure 9 is a cross sectional view taken on the line 9—9 of Figure 8;

Figure 10 is a side elevational view of still another modification;

Figure 11 is a longitudinal sectional view through a further modified form of processing tool; and Figure 12 is an end elevational view of the construction shown in Figure 11.

Referring now to the drawings and with special reference to the embodiment of the invention featured in Figures 1 and 2, it will be noted that the reference character 15 designates a processing tool having a revoluble arbor 16 provided with a tapered end portion 17 adapted to support two sets of processing rolls 18 and 19. In the present instance, both sets of processing rolls are tapered from end to end to a degree corresponding to the degree of taper of the portion 17 of the arbor, but in an opposite direction from the latter taper so as to permit the same to size or finish truly cylindrical surfaces.

The series of processing rolls 18 are held in assembled relation to each other by means of an annular cage 20 provided with circumferentially spaced slots 21 corresponding in number to the number of rolls 18, and each slot having the opposed side walls tapered to a degree corresponding to the taper of the rolls 18. The width of each of the slots 21 throughout the length thereof is greater than the diameter of the rolls 18 so as to permit the angular movement of the rolls in the cage 20 desired to effect the sliding pressure upon the surface to be processed. As shown in Figure 1, the forward ends of the slots 21 are preferably open to receive the rolls 18, and axial displacement of the latter relative to the cage during use, is prevented by means of an adjustable collar 22.

The series of rolls 19 are held in assembled relation by a cage 23 identical in construction to the cage 20 and having the rear end abutting the front side of the adjustable collar 22. The rolls 19 are prevented from axial displacement relative to the cage 23 by means of a washer 24 engaging the forward end of the cage and slidably supported upon a rod 25 extending axially through the tapered portion 17 of the arbor to a position in the counterbored portion 26 of the arbor in rear of the said tapered portion. The forward end of the rod projects beyond the washer 24 and is threaded for engagement with an adjusting nut 28 normally secured against accidental movement with respect to the rod by means of a set screw 29 and adapted to act upon the washer 24 to move the same axially of the arbor through the medium of a thrust bearing 30.

The rod 25 is held from rotation relative to the arbor 16 by means of a transverse pin 31 carried by the rear end of the rod for movement therewith and having the opposite ends projecting through elongated slots 32 formed in the arbor so as to permit shifting the rod axially of the arbor. The extremities of the pin 31 are secured in a collar 33 mounted upon the arbor in rear of the tapered portion 17 adjacent a second collar 34 freely mounted upon the arbor 16 and forming an abutment for the rear end of the cage 20. Inasmuch as the collar 33 rotates as a unit with the arbor relative to the collar 34, a suitable thrust bearing 35 is interposed between these collars and the collar 34 is normally yieldably urged into abutting relation with the rear end of the cage 20 by a spring 36 surrounding the arbor to the rear of the collar 33. As shown in Figure 1, the forward end of the spring actually abuts the rear side of the collar 33, while the rear end of the spring engages an abutment 37 fixed to the arbor and having a sleeve portion 38 extending forwardly through the spring to a position spaced a predetermined distance from the rear side of the collar 33. It will also be observed from Figure 1 that the abutment 37 is adjustably mounted on the arbor to vary the space between the forward end of the sleeve and the rear face of the collar 33.

The advantage of this adjustment will be apparent when it is considered that both sets of processing rolls are initially so positioned upon the tapered portion 17 of the arbor that the external diameter of the rolls is less than the internal diameter of the work piece to be finished in order to permit the tool to be readily inserted into the work. Accordingly, the width of the aforesaid space between the forward end of the sleeve 38 on the abutment 37 and the collar 33 is predetermined so that movement of the collar rearwardly into engagement with the forward end of the sleeve 38 expands both series of rolls to the proper diameters required to engage the rolls with the internal surface of the work to be finished. In the present instance, the collar is moved rearwardly the extent permitted by the width of the space by engagement of the rear end of the work with the front face of the collar 34 or, in other words, the rolls are expanded to the required diameters by the work to be processed. It will, of course, be apparent that the extent of expansion of the rolls depends upon the degree of axial rearward displacement of the rolls relative to the tapered portion 17 of the arbor, and that the ultimate diameter of both series of rolls may be varied by adjusting the abutment 37 to vary the space between the forward end of the sleeve 38 and rear face of the collar 33. Attention may be called to the fact at this point, that merely adjusting the abutment 37 axially of the arbor results in correspondingly varying the outside diameters of both sets of processing rolls and in order to independently vary the outside diameters of both sets of rolls the space between these sets of rolls must be varied. This is accomplished herein by interposing the adjustable collar 22 between the two sets of processing rolls and, as shown in Figure 2, this collar comprises a pair of cooperating sections having the adjacent faces serrated and inclined to a plane perpendicular to the axis of the arbor. With this latter construction, it will be apparent that the diameters of the two sets of rolls may be varied by merely loosening the adjusting nut 28 and relatively rotating the cooperating sections of the collar in one direction or the other depending upon whether it is desired to decrease or increase the space between the two series of rolls. Of course, varying the space between the two sets of rolls changes the relative positions of these rolls axially with respect to the tapered portion 17 of the arbor and thereby provides for changing the diameter of one set of rolls relative to the diameter of the other set.

Although a tool constructed in accordance with the foregoing will provide for subjecting the surface of the work to rolling and sliding pressures due to the angular movement of the rolls permitted by the cages, nevertheless, it may also be desired to peen the surface during the rolling operation. This may be accomplished in the embodiment of the invention described above, by providing circumferentially spaced axially extending cams 39 on the tapered surface of the portion 17 of the processing tool, so that the rolls will be periodically forced outwardly into engagement with the surface to be finished.

As previously stated, the desired peening action of the processing rolls on the surface of the work may be secured by periodically relieving the pressure of engagement of the processing rolls with said surface, and one method of accomplishing this result is shown in the embodiment of the invention disclosed in Figures 3 and 4. This embodiment of the invention differs from the one previously described in that the collar 33' is fixed against rotation with the arbor 16', but is permitted to slide axially with respect to this arbor, in the manner designated by the reference character 40. Consequently, the thrust bearing 35, previously described, may be omitted and in the present instance the adjacent radial surfaces of the two collars 33' and 34' are fashioned to form cooperating cam faces in the manner shown in Figure 3.

In the present embodiment of the invention the extremities of the transverse pin 31' carried by the rear end of the rod 25' extend into the collar 34' so that the latter collar rotates as a unit with the arbor 16', and is also capable of a limited axial movement relative to the arbor due to the elongated slots 32' through which the transverse pin extends. With the above construction it will be apparent that as the arbor 16' is rotated, the cam face on the collar 34' cooperates with the correspondingly cammed face on the collar 33' to periodically move the collar 34' forwardly and thereby contract or reduce the outside diameters of the two sets of processing rolls. It will, of course, be apparent that the same results can be obtained by holding the collar stationary and axially moving the arbor relative thereto. The foregoing construction, in addition to providing the desirable peening action, also insures moving different portions of the processing rolls into contact with the surface of the work during the rolling operation.

In Figure 5 of the drawings, I have shown a rotary processing tool having provision for finishing a surface extending radially with respect to the axis of rotation and having means for simultaneously finishing a surface concentric with respect to the axis of rotation. In detail, the tool shown in Figure 5 comprises two sets of processing rolls 41 and 42 supported upon a rotatable arbor 43 in axial spaced relation to each other. The series of processing rolls 41 are held in assembled relationship by means of a cage 44 having a plurality of circumferentially spaced axially extending slots 45 open at the forward end of the cage to permit inserting the rolls into the same. As in the first described form of the invention, the slots 45 are of sufficient width to provide limited angular displacement of the processing rolls relative to the cage and this is desirable, since it affords the combined sliding and rolling action previously referred to. In the event it is desired to incorporate the peening function during the rolling operation, the portion of the arbor supporting the rolls 41 may be provided with circumferentially spaced depressions, which as shown, are the flats 46 extending axially of the arbor and operable to periodically force the processing rolls outwardly to effect a blow against the surface being rolled.

The processing rolls 45 are held against axial displacement relative to the cage 44 by means of a spacer 47 sleeved upon the arbor in advance of the cage 44 and engageable with the front end of the latter in the manner shown in Figure 5. The forward end of the spacer has an abutment for the rear end of the cage 48 similar to the construction of the cage 44 and operable to hold the processing rolls 42 in assembled relationship. The slots 49 in the cage 48 are sufficiently wider than the diameter of the processing rolls 42 to provide the angular displacement of the rolls previously referred to, and the open ends of the slots are normally closed by means of a collar 50 held in assembled relation upon the arbor by a nut 51 threaded upon the forward end of the arbor.

The arbor 43 is provided with an enlarged portion 52 at a point spaced rearwardly from the cage 44 and this enlarged portion forms an abutment for a spacer 53, which in turn supports a third set of processing rolls 54. The processing rolls 54 extend radially with respect to the axis of rotation of the arbor and are held in assembled relationship by means of a cage 55 having a hub 56 supported on the arbor in spaced relation to the cage 44 by means of a spacer 57 and having a series of radially extending slots open at the outer ends to permit inserting the processing rolls 54 into the cage. The width of the slots is preferably greater than the diameter of the processing rolls to afford angular displacement of the latter during the rolling operation and, if desired, the front face of the spacer 53 may be provided with a series of radially extending projections for periodically forcing the processing rolls 54 to effect a blow against the surface being rolled, in the same manner as described above. In the present instance, the rolls 54 are held from outward displacement with respect to the cage 55 by means of a sleeve 59 having the rear end secured to the arbor and having the forward end sleeved over the enlargement 52, spacer 53, and periphery of the cage 55. A tool constructed in accordance with the foregoing renders it possible to not only roll the internal annular surface of a work piece, but at the same time provides for finishing one end of the work piece.

The tools previously described are particularly designed to finish the internal annular surface of a bore, and in order to illustrate that the principles of the present invention are equally applicable for finishing external annular surfaces, reference will now be made to Figures 8 and 9. In Figure 8, the work piece having the external surface to be finished is designated by the reference character 60 and the processing tool is indicated generally by the reference character 61. In detail, the processing tool comprises a revoluble head 62 embodying two axially spaced sets of processing rolls 63 and 64. The cage for the rear processing rolls 63 is designated by the reference character 65 and is sleeved within a collar 66 which in turn is secured in the rear portion of the rotatable head 62 by means of the tap screw 67. The cage 65 is secured against rearward axial displacement with respect to the collar 66 by means of an insert 68 and the forward portion of the cage is provided with a plurality of slots 69 open at the front ends to receive the rolls 63. Displacement of the rolls axially forwardly with respect to the cage 65 is prevented by a ring 70 snapped into a counterbored portion of the collar at the front side thereof in accordance with conventional practice. As in all of the foregoing embodiments of the invention, each of the slots 69 is greater in width throughout the length thereof than the diameter of the rolls so as to permit the desired angular displacement of the rolls relative to the cage during the rolling operation. In addition, the internal surface of the collar 66 engaging the rolls is fashioned to provide a plurality of cams 71 operable to periodically force the rolls inwardly to effect a blow upon the surface of the work during the rolling operation. The front set of processing rolls 64 are maintained in spaced relation with respect to the rear set of processing rolls by means of a spacer 72, and the construction associated with the former set of rolls is identical to the construction previously described in connection with the rear set of rolls.

Due to the fact that the surfaces of the valve seats of an internal combustion engine, for example, must be extremely accurate in order to secure efficient operation I propose to finish surfaces of this character by a processing tool constructed in accordance with this invention. The tool shown in Figure 10 is particularly designed for finishing frustoconical or tapered surfaces and comprises a rotatable arbor 80 having a pilot 81 sleeved in the forward end thereof in the manner clearly shown in Figure 10. It will also be observed from this figure that the extreme front end of the arbor is provided with a tapered or frustoconical surface 82 forming a support for a series of processing rolls 83 held in assembled relationship by means of a cage 84 positioned at the forward end against an enlargement 85 on the pilot 81. The cage 84 is provided with a plurality of slots 86 corresponding in number to the number of rolls and open at the outer ends to receive the rolls. The slots 86 are wider than the diameter of the rolls so as to provide the angular displacement of the rolls required to secure the combined rolling and sliding action and, if desired, the frustoconical surface 82 may be provided with a plurality of cams similar to the cams 71 for periodically forcing the rolls outwardly to effect a blow on the surface during the rolling operation. The rolls are held in assembled relation within the slots by means of a collar 87 secured to the arbor and having a portion receiving the rear end of the cage in the manner clearly shown in Figure 10.

All of the tools previously described have been restricted in their use to finishing true surfaces and accordingly, I have illustrated in Figures 11 and 12 a processing tool capable of finishing curved surfaces. In detail, the processing tool in Figure 11 is provided with a rotatable arbor 90 having a portion 91 at the forward end providing, in effect, a prolate spheroidal surface 92 forming a support for the rolls 93 which are curved about their major axes in the manner shown in Figure 11. The rolls 93 are supported in a cage 94 secured to the extreme front end of the arbor by means of a nut 95 threaded upon the arbor and, in addition, having slots 96 for receiving the rolls 93. The slots 96 are of sufficient dimension to afford the angular displacement of the rolls 93 required to effect the combined rolling and sliding action and, also in this instance, the prolate spheroidal surface 92 may be provided with cams in the event it is desired to periodically force the rolls 93 outwardly to effect a blow on the surface of the work being rolled.

Thus from the foregoing it will be observed that the present invention contemplates processing surfaces of numerous different types and, as a consequence, possesses a greater application than processing tools heretofore produced. It will also be apparent that in each of the several embodiments of the invention selected herein for the purpose of illustration, the processing rolls are supported in such a manner as to permit angular displacement of the rolls relative to the retainer therefor, so that the surface being processed will be subjected to combined rolling and sliding pressures. In addition, each of the several embodiments of the invention offers the possibility of imparting a successive series of impacts to the surface being processed, during the rolling operation, and this feature is desirable in many instances, since it provides for increasing the density of the metal forming the surface being finished.

What I claim as my invention is:

1. A work processing tool comprising a revoluble member having a tapered annular surface, rotatable processing rolls supported upon said surface and correspondingly tapered in an opposite direction to provide for processing cylindrical surfaces, means for moving the rolls into engagement with the cylindrical surface of the work to be processed, and means operable in dependence upon rotation of the revoluble member to periodically reciprocate the rolls axially of the tapered surface.

2. A work processing tool comprising a revoluble member having a tapered annular surface extending in the direction of the axis of rotation of said member, rotatable processing rolls supported upon said surface, means for retaining the rolls in assembled relationship including a retainer, and means operable in dependence upon rotation of the revoluble member for moving the rolls axially of the tapered surface in a direction to relieve the pressure of engagement of the rolls with the surface of the work being processed.

3. A work processing tool comprising a revoluble member having a tapered annular surface extending in the direction of the axis of rotation of said member, rotatable processing rolls supported upon the tapered surface for engagement with the surface of the work to be processed, means for retaining the rolls in assembled relationship providing limited angular displacement of the rolls relative to the surface of the work being processed, and means operable in dependence upon rotation of said member to periodically move the rolls axially of the tapered surface in a direction to relieve the pressure of engagement of the rolls with the surface of the work.

4. A work processing tool comprising a revoluble member having a tapered annular surface extending in the direction of the axis of said member, rotatable processing rolls supported upon the tapered surface and insertable into a bore of the work having a surface to be processed, means for retaining the processing rolls in assembled relationship providing angular displacement of the rolls relative to the surface aforesaid of the work, means operable in dependence upon inserting the processing rolls into the bore for expanding the rolls into contact with the surface of the bore to be processed, and means operable in dependence upon rotation of the revoluble member for periodically moving the rolls axially of the tapered surface on said member in a direction to permit movement of the rolls inwardly with respect to the surface aforesaid of the bore.

5. A work processing tool comprising a revoluble member having a tapered annular surface extending in the direction of the axis of the revoluble member, two sets of rotatable processing rolls supported upon the tapered surface of said member in axial spaced relationship and being correspondingly tapered in a direction opposite to the taper of said surface, and a spacer interposed between the two sets of processing rolls adjustable to vary the space therebetween.

6. A work processing tool comprising a revoluble member having a surface extending radially with respect to the axis of rotation thereof, a series of rotatable processing rolls having their axes also extending radially with respect to the axis of rotation of the member and supported against the surface aforesaid for engagement with a radial surface on the work to be processed, and means for retaining the processing rolls in assembled relationship providing limited angular displacement of the rolls relative to the radial surface of the work to be processed.

7. A work processing tool comprising a revoluble member having an axially extending portion and having a portion extending radially with respect to the axis of rotation thereof, rotatable processing rolls supported on the axially extending portion for engagement with one surface of the work to be processed, a second series of rotatable processing rolls extending radially with respect to the axis of rotation and supported in engagement with the radial surface of said member, and retainers for holding the two sets of processing rolls in assembled relationship and providing angular displacement of the rolls with respect to the surfaces of the work engaged thereby.

8. A work processing tool comprising a revoluble member having an annular portion for receiving the work having a surface to be processed, rotatable processing rolls for engagement with the external surface of the work to be processed, and means supporting the processing rolls in the annular portion of the rotatable member in circumferential spaced relationship around the work including a retainer providing for circumferential angular displacement of the rolls across the surface of the work to impart combined rolling and sliding pressures to said surface.

9. A work processing tool comprising a revoluble member having a spheroidal surface, rotatable processing rolls having their external surfaces curved with respect to the major axes thereof to correspond with the spheroidal surface aforesaid on the member and engageable with a similar surface of the work to be processed, and means for retaining the rolls in circumferential spaced relationship around the spheroidal surface and permitting angular displacement of the rolls across said surface during the processing operation to impart combined rolling and sliding pressures on said surface.

10. A work processing tool comprising a revoluble member having a frustoconical surface, rotatable processing rolls supported upon said surface for engagement with the surface of the work to be processed, means for retaining the rolls in assembled relationship, and means for periodically relatively moving the rolls and revoluble member axially in a direction to relieve the pressure of engagement of the rolls with the surface of the work being processed.

11. A work processing tool comprising a revoluble member having a frustoconical surface, rotatable processing rolls supported upon the surface for engagement with the surface of the work to be processed, means for retaining the rolls in assembled relationship, and means operable in dependence upon rotation of the revoluble member to periodically relatively move said member and rolls in an axial direction to relieve the pressure of engagement of the rolls with the surface of the work being processed.

12. A work processing tool comprising a revoluble member having a tapered surface, rotatable processing rolls supported upon said surface and correspondingly tapered in an opposite direction to provide for processing cylindrical surfaces, means for moving the rolls into engagement with the cylindrical surface of the work to be processed and means for periodically relatively reciprocating the revoluble member and rolls.

13. A work processing tool comprising a revoluble member having a surface extending outwardly with respect to the axis of rotation thereof, a series of rotatable processing rolls having their axes also extending outwardly with respect to the axis of rotation of the member and supported against the surface aforesaid for engagement with the corresponding surface of the work to be processed, means for retaining the processing rolls in assembled relationship providing limited angular displacement of the rolls relative to the surface of the work to be processed, and means for periodically relieving the pressure of engagement of the rolls with said surface.

14. A work processing tool comprising a revoluble member having an annular portion for receiving the work, rotatable processing rolls engageable with the external surface of the work to be processed, means for supporting the processing rolls in the annular portion of the rotatable member permitting angular displacement of the rolls relative to the surface of the work to be processed, and cam means for periodically urging the rolls into engagement with the surface of the work and for relieving the pressure of engagement of the rolls with the surface of the work.

15. A work processing tool comprising a revoluble member having a surface extending outwardly with respect to the axis of rotation of said member, a series of rotatable processing rolls having their axes also extending outwardly with respect to the axis of rotation of said member and supported against the outwardly extending surface for engagement with the surface of the work to be processed, and means for retaining the processing rolls in circumferential spaced relationship and providing for limited angular displacement of the rolls across the surface of the work to be processed to impart combined rolling and sliding pressures to the latter surface.

HARRY C. SATTERTHWAITE.